United States Patent
Rosa et al.

(10) Patent No.: US 12,477,577 B2
(45) Date of Patent: Nov. 18, 2025

(54) CHANNEL SENSING

(71) Applicant: Nokia Technologies Oy, Espoo (FI)

(72) Inventors: Claudio Rosa, Randers NV (DK); Nuno Manuel Kiilerich Pratas, Gistrup (DK); Olli Alanen, Vantaa (FI); Mika Kasslin, Espoo (FI); Adrian Garcia Rodriguez, Santa Cruz de Tenerife (ES); Lorenzo Galati Giordano, Stuttgart (DE)

(73) Assignee: Nokia Technologies Oy, Espoo (FI)

( * ) Notice: Subject to any disclaimer, the term of this patent is extended or adjusted under 35 U.S.C. 154(b) by 390 days.

(21) Appl. No.: 18/001,169

(22) PCT Filed: Jul. 13, 2020

(86) PCT No.: PCT/EP2020/069790
§ 371 (c)(1),
(2) Date: Dec. 8, 2022

(87) PCT Pub. No.: WO2022/012737
PCT Pub. Date: Jan. 20, 2022

(65) Prior Publication Data
US 2023/0217488 A1 Jul. 6, 2023

(51) Int. Cl.
*H04W 74/0808* (2024.01)
*H04W 72/23* (2023.01)

(52) U.S. Cl.
CPC ....... *H04W 74/0808* (2013.01); *H04W 72/23* (2023.01)

(58) Field of Classification Search
None
See application file for complete search history.

(56) References Cited

U.S. PATENT DOCUMENTS

| 10,568,116 B2 | 2/2020 | Park et al. |
| 2017/0325258 A1 | 11/2017 | Nogami et al. |

(Continued)

FOREIGN PATENT DOCUMENTS

| CN | 110831201 A | 2/2020 |
| EP | 3407659 A1 | 11/2018 |

(Continued)

OTHER PUBLICATIONS

Office action received for corresponding Japanese Patent Application No. 2023-502770, dated Jan. 11, 2024, 1 pages of office action and 2 pages of summary available.

(Continued)

*Primary Examiner* — Clemence S Han
(74) *Attorney, Agent, or Firm* — Barta Jones, PLLC

(57) ABSTRACT

An apparatus comprising: at least one processor; and at least one memory including computer program code; the at least one memory and the computer program code configured to, with the at least one processor, cause the apparatus at least to perform: receiving control information including a slot format indicator configured to indicate scheduled channel usage for time units, wherein the slot format indicator includes at least one indicator configured to indicate that simultaneous uplink and downlink communications are scheduled to occur on a shared channel in at least one of the time units; and determining a type of channel sensing to use prior to initiating an uplink transmission on at least a portion of the shared channel based, at least in part, on the control information, wherein determining a type of channel sensing to use comprises analysing the scheduled channel usage for, at least, the time unit in which the uplink transmission is scheduled to be initiated and the time unit before the time unit in which the uplink transmission is scheduled to be initiated.

12 Claims, 5 Drawing Sheets

(56) References Cited

U.S. PATENT DOCUMENTS

| | | | |
|---|---|---|---|
| 2017/0339721 | A1 | 11/2017 | Mukherjee et al. |
| 2019/0200379 | A1 | 6/2019 | Wang et al. |
| 2019/0364434 | A1 | 11/2019 | Kwak et al. |
| 2020/0045696 | A1 | 2/2020 | Huang et al. |
| 2020/0052865 | A1 | 2/2020 | Liou et al. |
| 2020/0228196 | A1* | 7/2020 | John Wilson ............ H04L 5/00 |
| 2021/0203469 | A1* | 7/2021 | Abedini ............... H04L 5/0053 |
| 2021/0297226 | A1* | 9/2021 | Abotabl ............... H04L 5/1461 |
| 2021/0400637 | A1* | 12/2021 | Abotabl ........... H04W 72/0446 |
| 2021/0400673 | A1* | 12/2021 | Abotabl ............... H04W 72/53 |
| 2022/0007395 | A1* | 1/2022 | Lei ........................ H04L 1/0003 |
| 2022/0014345 | A1* | 1/2022 | Abdelghaffar .... H04W 72/0446 |

FOREIGN PATENT DOCUMENTS

| | | |
|---|---|---|
| JP | 2019-507537 A | 3/2019 |
| WO | 2018/172620 A1 | 9/2018 |
| WO | 2019/108601 A1 | 6/2019 |
| WO | 2019/215670 A1 | 11/2019 |
| WO | 2020/016938 A1 | 1/2020 |
| WO | 2022/012735 A1 | 1/2022 |

OTHER PUBLICATIONS

Office action received for corresponding Chinese Patent Application No. 202080104793.5, dated Dec. 30, 2024, 6 pages of office action and no page of translation available.

"Remaining details on NR-U uplink signals and channels", 3GPP TSG RANWG1 #99, R1-1912259, Agenda: 7.2.2.1.3, Nokia, Nov. 18-22, 2019, 16 pages.

Koorapaty, "Study on Licensed-Assisted Access to Unlicensed Spectrum", Teleconference with Wi-Fi Alliance CoX TG (Coexistence Task Group), RP-150565, Ericsson Inc., May 19, 2015, pp. 1-21.

"3rd Generation Partnership Project; Technical Specification Group Radio Access Network; Study on Licensed-Assisted Access to Unlicensed Spectrum; (Release 13)", 3GPP TR 36.889, V0.4.0, Apr. 2015, pp. 1-45.

"3rd Generation Partnership Project; Technical Specification Group Radio Access Network; Physical layer procedures for shared spectrum channel access (Release 16)", 3GPP TS 37.213, V16.1.0, Mar. 2020, pp. 1-25.

"3rd Generation Partnership Project; Technical Specification Group Radio Access Network; NR; Physical channels and modulation (Release 16)", 3GPP TS 38.211, V16.1.0, Mar. 2020, pp. 1-130.

"3rd Generation Partnership Project; Technical Specification Group Radio Access Network; NR; Multiplexing and channel coding (Release 16)", 3GPP TS 38.212, V16.1.0, Mar. 2020, pp. 1-146.

"3rd Generation Partnership Project; Technical Specification Group Radio Access Network; NR; Physical layer procedures for control (Release 16)", 3GPP TS 38.213, V16.1.0, Mar. 2020, pp. 1-156.

"5 GHz RLAN; Harmonised Standard covering the essential requirements of article 3.2 of Directive 2014/53/EU", ETSI EN 301 893, V2.1.1, May 2017, pp. 1-122.

International Search Report and Written Opinion received for corresponding Patent Cooperation Treaty Application No. PCT/EP2020/069790, dated Mar. 25, 2021, 13 pages.

* cited by examiner

CHANNEL SENSING

RELATED APPLICATION

This application was originally filed as PCT Application No. PCT/EP2020/069790, filed on Jul. 13, 2020, which is incorporated herein by reference in its entirety.

TECHNOLOGICAL FIELD

Embodiments of the present disclosure relate to channel sensing. Some relate to channel sensing prior to uplink transmissions with flexible frequency division duplexing on a channel among different communication systems.

BACKGROUND

A wireless network comprises a plurality of network nodes including terminal nodes and access nodes. Communication between the terminal nodes and access nodes is wireless.

In some circumstances it may be desirable to improve sharing of a channel for simultaneous uplink and downlink transmissions.

BRIEF SUMMARY

According to various, but not necessarily all, embodiments there is provided examples as claimed in the appended claims.

According to various, but not necessarily all, embodiments there is provided an apparatus comprising:
  at least one processor; and
  at least one memory including computer program code;
  the at least one memory and the computer program code configured to, with the at least one processor, cause the apparatus at least to perform:
  receiving control information including a slot format indicator configured to indicate scheduled channel usage for time units, wherein the slot format indicator includes at least one indicator configured to indicate that simultaneous uplink and downlink communications are scheduled to occur on a shared channel in at least one of the time units; and
  determining a type of channel sensing to use prior to initiating an uplink transmission on at least a portion of the shared channel based, at least in part, on the control information, wherein determining a type of channel sensing to use comprises analysing the scheduled channel usage for, at least, the time unit in which the uplink transmission is scheduled to be initiated and the time unit before the time unit in which the uplink transmission is scheduled to be initiated.

In some examples, determining a type of channel sensing to use comprises determining a type of channel sensing to use prior to initiating an uplink transmission in a time unit in which simultaneous uplink and downlink communications are scheduled to occur on the shared channel.

In some examples, the slot format indicator is configured to indicate the type of duplexing scheduled to occur in the time units.

In some examples, the slot format indicator comprises information configured to indicate, at least, downlink, uplink, flexible or simultaneous uplink and downlink on the shared channel for the time units.

In some examples, determining a type of channel sensing to use comprises determining not to use channel sensing prior to initiating the uplink transmission.

In some examples, determining a type of channel sensing to use comprises: determining if a part of the shared channel is scheduled for downlink transmissions in at least one of the time units before the time unit in which the uplink transmission is scheduled to be initiated; and
  determining if a part of the shared channel is scheduled for simultaneous uplink and downlink transmissions in the time unit in which the uplink transmission is scheduled to be initiated; and
  if it is determined that the part of the shared channel is scheduled for downlink transmissions in the at least one the time units before the time unit in which the uplink transmission is scheduled to be initiated and it is determined that the part of the shared channel is scheduled for simultaneous uplink and downlink transmissions in the time unit in which the uplink transmission is scheduled to be initiated, determining not to use channel sensing prior to initiating the uplink transmission.

In some examples, determining a type of channel sensing to use comprises:
  determining if the shared channel is scheduled for simultaneous uplink and downlink transmissions in time unit or units in which the uplink transmission is scheduled to occur immediately after the time unit in which the uplink transmission is scheduled to be initiated; and
  if it is determined that the channel is scheduled for simultaneous uplink and downlink transmissions in time unit or units in which the uplink transmission is scheduled to occur immediately after the time unit in which the uplink transmission is scheduled to be initiated, determining not to use channel sensing prior to initiating the uplink transmission.

In some examples, the control information comprises at least one reference to a data structure.

In some examples, the slot format indicator comprises, for the time units, an indication of a proportion of the shared channel scheduled for uplink and/or downlink, including time units scheduled for simultaneous uplink and downlink on the shared channel.

In some examples, the slot format indicator comprises, for the time units, an indication of the location of a guard band in the shared channel.

According to various, but not necessarily all, embodiments there is provided a method comprising:
  receiving control information, including a slot format indicator configured to indicate scheduled channel usage for time units, wherein the slot format indicator includes at least one indicator configured to indicate that simultaneous uplink and downlink communications are scheduled to occur on a shared channel in at least one of the time units; and
  determining a type of channel sensing to use prior to initiating an uplink transmission on at least a portion of the shared channel based, at least in part, on the control information, wherein determining a type of channel sensing to use comprises analysing the scheduled channel usage for, at least, the time unit in which the uplink transmission is scheduled to be initiated and the time unit before the time unit in which the uplink transmission is scheduled to be initiated.

In some examples, determining a type of channel sensing to use comprises determining a type of channel sensing to use prior to initiating an uplink transmission in a time unit in which simultaneous uplink and downlink communications are scheduled to occur on the shared channel.

In some examples, the slot format indicator is configured to indicate the type of duplexing scheduled to occur in the time units.

In some examples, the slot format indicator comprises information configured to indicate, at least, downlink, uplink, flexible or simultaneous uplink and downlink on the shared channel for the time units.

In some examples, determining a type of channel sensing to use comprises determining not to use channel sensing prior to initiating the uplink transmission.

In some examples, determining a type of channel sensing to use comprises: determining if a part of the shared channel is scheduled for downlink transmissions in at least one of the time units before the time unit in which the uplink transmission is scheduled to be initiated; and
- determining if a part of the shared channel is scheduled for simultaneous uplink and downlink transmissions in the time unit in which the uplink transmission is scheduled to be initiated; and
- if it is determined that the part of the shared channel is scheduled for downlink transmissions in at least one of the time units before the time unit in which the uplink transmission is scheduled to be initiated and it is determined that the part of the shared channel is scheduled for simultaneous uplink and downlink transmissions in the time unit in which the uplink transmission is scheduled to be initiated, determining not to use channel sensing prior to initiating the uplink transmission.

In some examples, determining a type of channel sensing to use comprises:
- determining if the shared channel is scheduled for simultaneous uplink and downlink transmissions in time unit or units in which the uplink transmission is scheduled to occur immediately after the time unit in which the uplink transmission is scheduled to be initiated; and
- if it is determined that the channel is scheduled for simultaneous uplink and downlink transmissions in time unit or units in which the uplink transmission is scheduled to occur immediately after the time unit in which the uplink transmission is scheduled to be initiated, determining not to use channel sensing prior to initiating the uplink transmission.

In some examples, the control information comprises at least one reference to a data structure.

In some examples, the slot format indicator comprises, for the time units, an indication of a proportion of the shared channel scheduled for uplink and/or downlink, including time units scheduled for simultaneous uplink and downlink on the shared channel.

In some examples, the slot format indicator comprises, for the time units, an indication of the location of a guard band in the shared channel.

According to various, but not necessarily all, embodiments there is provided a computer program comprising instructions for causing an apparatus to perform at least the following:
- receiving control information including a slot format indicator configured to indicate scheduled channel usage for time units, wherein the slot format indicator includes at least one indicator configured to indicate that simultaneous uplink and downlink communications are scheduled to occur on a shared channel in at least one of the time units; and
- determining a type of channel sensing to use prior to initiating an uplink transmission on at least a portion of the shared channel based, at least in part, on the control information, wherein determining a type of channel sensing to use comprises analysing the scheduled channel usage for, at least, the time unit in which the uplink transmission is scheduled to be initiated and the time unit before the time unit in which the uplink transmission is scheduled to be initiated.

In some examples, determining a type of channel sensing to use comprises determining a type of channel sensing to use prior to initiating an uplink transmission in a time unit in which simultaneous uplink and downlink communications are scheduled to occur on the shared channel.

In some examples, the slot format indicator is configured to indicate the type of duplexing scheduled to occur in the time units.

In some examples, the slot format indicator comprises information configured to indicate, at least, downlink, uplink, flexible or simultaneous uplink and downlink on the shared channel for the time units.

In some examples, determining a type of channel sensing to use comprises determining not to use channel sensing prior to initiating the uplink transmission.

In some examples, determining a type of channel sensing to use comprises: determining if a part of the shared channel is scheduled for downlink transmissions in at least one of the time units before the time unit in which the uplink transmission is scheduled to be initiated; and
- determining if a part of the shared channel is scheduled for simultaneous uplink and downlink transmissions in the time unit in which the uplink transmission is scheduled to be initiated; and
- if it is determined that the part of the shared channel is scheduled for downlink transmissions in at least one of the time units before the time unit in which the uplink transmission is scheduled to be initiated and it is determined that the part of the shared channel is scheduled for simultaneous uplink and downlink transmissions in the time unit in which the uplink transmission is scheduled to be initiated, determining not to use channel sensing prior to initiating the uplink transmission.

In some examples, determining a type of channel sensing to use comprises:
- determining if the shared channel is scheduled for simultaneous uplink and downlink transmissions in time unit or units in which the uplink transmission is scheduled to occur immediately after the time unit in which the uplink transmission is scheduled to be initiated; and
- if it is determined that the channel is scheduled for simultaneous uplink and downlink transmissions in time unit or units in which the uplink transmission is scheduled to occur immediately after the time unit in which the uplink transmission is scheduled to be initiated, determining not to use channel sensing prior to initiating the uplink transmission.

In some examples, the control information comprises at least one reference to a data structure.

In some examples, the slot format indicator comprises, for the time units, an indication of a proportion of the shared channel scheduled for uplink and/or downlink, including time units scheduled for simultaneous uplink and downlink on the shared channel.

In some examples, the slot format indicator comprises, for the time units, an indication of the location of a guard band in the shared channel.

In some examples there is provided a UE comprising an apparatus as described in any preceding paragraph and/or as described herein.

According to various, but not necessarily all, embodiments there is provided an apparatus comprising:
 at least one processor; and
 at least one memory including computer program code;
 the at least one memory and the computer program code configured to, with the at least one processor, cause the apparatus at least to perform:
  determining control information including a slot format indicator configured to indicate scheduled channel usage for time units, wherein the slot format indicator includes at least one indicator configured to indicate that simultaneous uplink and downlink communications are scheduled to occur on a shared channel in at least one of the time units; and
  causing transmission of the control information to at least one user equipment.

In some examples, the slot format indicator is configured to indicate the type of duplexing scheduled to occur in the time units.

In some examples, the slot format indicator comprises information configured to indicate, at least, downlink, uplink, flexible or simultaneous uplink and downlink on the shared channel for the time units.

In some examples, the control information comprises at least one reference to a data structure.

In some examples, the slot format indicator comprises, for the time units, an indication of a proportion of the shared channel scheduled for uplink and/or downlink, including time units scheduled for simultaneous uplink and downlink on the shared channel.

In some examples, the slot format indicator comprises, for the time units, an indication of the location of a guard band in the shared channel.

In some examples, the at least one memory and the computer program code configured to, with the at least one processor, cause the apparatus at least to perform:
 receiving one or more uplink transmissions from one or more of the at least one UE.

According to various, but not necessarily all, embodiments there is provided a method comprising:
 determining control information including a slot format indicator configured to indicate scheduled channel usage for time units, wherein the slot format indicator includes at least one indicator configured to indicate that simultaneous uplink and downlink communications are scheduled to occur on a shared channel in at least one of the time units; and
 causing transmission of the control information to at least one user equipment.

In some examples, the slot format indicator is configured to indicate the type of duplexing scheduled to occur in the time units.

In some examples, the slot format indicator comprises information configured to indicate, at least, downlink, uplink, flexible or simultaneous uplink and downlink on the shared channel for the time units.

In some examples, the control information comprises at least one reference to a data structure.

In some examples, the slot format indicator comprises, for the time units, an indication of a proportion of the shared channel scheduled for uplink and/or downlink, including time units scheduled for simultaneous uplink and downlink on the shared channel.

In some examples, the slot format indicator comprises, for the time units, an indication of the location of a guard band in the shared channel.

In some examples, the at least one memory and the computer program code configured to, with the at least one processor, cause the apparatus at least to perform:
 causing receiving one or more uplink transmissions from one or more of the at least one UE.

According to various, but not necessarily all, embodiments there is provided a computer program comprising instructions for causing an apparatus to perform at least the following:
 determining control information including a slot format indicator configured to indicate scheduled channel usage for time units, wherein the slot format indicator includes at least one indicator configured to indicate that simultaneous uplink and downlink communications are scheduled to occur on a shared channel in at least one of the time units; and
 causing transmission of the control information to at least one user equipment.

In some examples, the slot format indicator is configured to indicate the type of duplexing scheduled to occur in the time units.

In some examples, the slot format indicator comprises information configured to indicate, at least, downlink, uplink, flexible or simultaneous uplink and downlink on the shared channel for the time units.

In some examples, the control information comprises at least one reference to a data structure.

In some examples, the slot format indicator comprises, for the time units, an indication of a proportion of the shared channel scheduled for uplink and/or downlink, including time units scheduled for simultaneous uplink and downlink on the shared channel.

In some examples, the slot format indicator comprises, for the time units, an indication of the location of a guard band in the shared channel.

In some examples, the at least one memory and the computer program code configured to, with the at least one processor, cause the apparatus at least to perform:
 receiving one or more uplink transmissions from one or more of the at least one UE.

In some examples, there is provided a gNB comprising an apparatus as described in any preceding paragraph and/or as described herein.

According to various, but not necessarily all, embodiments there is provided an apparatus comprising means for:
 causing receiving control information including a slot format indicator configured to indicate scheduled channel usage for time units, wherein the slot format indicator includes at least one indicator configured to indicate that simultaneous uplink and downlink communications are scheduled to occur on a shared channel in at least one of the time units; and
 determining a type of channel sensing to use prior to initiating an uplink transmission on at least a portion of the shared channel based, at least in part, on the control information, wherein determining a type of channel sensing to use comprises analysing the scheduled channel usage for, at least, the time unit in which the uplink transmission is scheduled to be initiated and the time unit before the time unit in which the uplink transmission is scheduled to be initiated.

In some examples, there is provided an apparatus comprising means for performing a method at a UE as described herein.

According to various, but not necessarily all, embodiments there is provide an apparatus comprising means for:

determining control information including a slot format indicator configured to indicate scheduled channel usage for time units, wherein the slot format indicator includes at least one indicator configured to indicate that simultaneous uplink and downlink communications are scheduled to occur on a shared channel in at least one of the time units; and causing transmission of the control information to at least one user equipment.

In some examples, there is provided an apparatus comprising means for performing a method at a gNB as described herein.

According to various, but not necessarily all, embodiments there is provided an apparatus comprising:

at least one processor; and at least one memory including computer program code;

the at least one memory and the computer program code configured to, with the at least one processor, cause the apparatus at least to perform:

receiving control information, the control information comprising information configured for use in controlling one or more uplink transmissions by a client device in one or more time units using at least a portion of a shared channel, wherein the control information comprises information configured to indicate scheduled channel usage for the time units, including at least one indicator configured to indicate that simultaneous uplink and downlink communications are scheduled to occur on the channel in at least one of the time units; and determining a form of channel sensing to use prior to initiating an uplink transmission on at least a portion of the channel based, at least in part, on the control information.

The description of a function and/or action should additionally be considered to also disclose any means suitable for performing that function and/or action.

BRIEF DESCRIPTION

Some examples will now be described with reference to the accompanying drawings in which.

DETAILED DESCRIPTION

Figure 1:
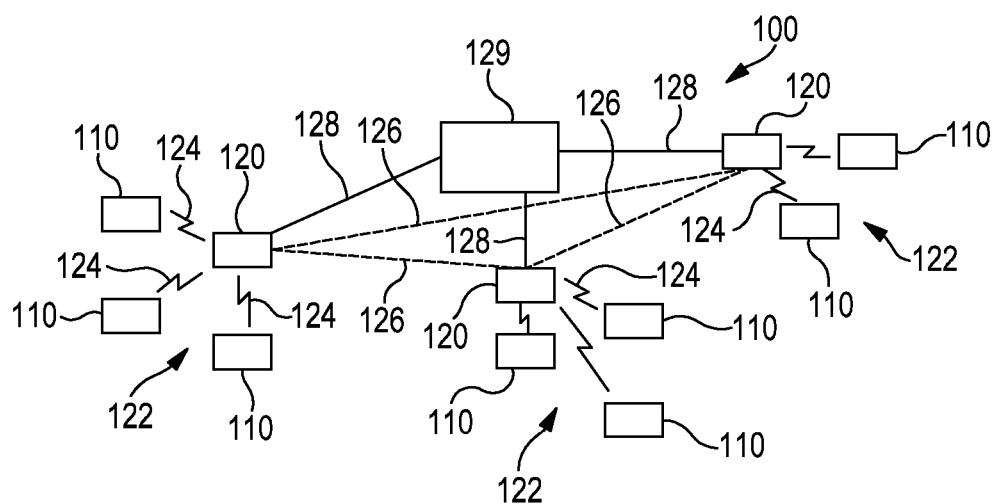
FIG. 1 shows an example of the subject matter described herein.

FIG. 1 illustrates an example of a network 100 comprising a plurality of network nodes including terminal nodes 110, access nodes 120 and one or more core nodes 129. The terminal nodes 110 and access nodes 120 communicate with each other. The one or more core nodes 129 communicate with the access nodes 120.

The one or more core nodes 129 may, in some examples, communicate with each other. The one or more access nodes 120 may, in some examples, communicate with each other.

The network 100 may be a cellular network comprising a plurality of cells 122 at least one served by an access node 120. In this example, the interface between the terminal nodes 110 and an access node 120 defining a cell 122 is a wireless interface 124.

The access node 120 is a cellular radio transceiver. The terminal nodes 110 are cellular radio transceivers.

In the example illustrated the cellular network 100 is a third generation Partnership Project (3GPP) network in which the terminal nodes 110 are user equipment (UE) and the access nodes 120 are base stations.

In some examples the network 100 is an Evolved Universal Terrestrial Radio Access network (E-UTRAN). The E-UTRAN consists of E-UTRAN NodeBs (eNBs) 120, providing the E-UTRA user plane and control plane protocol terminations towards the UE 110. The eNBs 120 are interconnected with each other by means of an X2 interface 126. The eNBs are also connected by means of the S1 interface 128 to the Mobility Management Entity (MME) 129.

In some examples the network 100 is a Next Generation (or New Radio, NR) Radio Access network (NG-RAN). The NG-RAN consists of gNodeBs (gNBs) 120, providing the user plane and control plane protocol terminations towards the UE 110. The gNBs 120 are interconnected with each other by means of an X2/Xn interface 126. The gNBs are also connected by means of the N2 interface 128 to the Access and Mobility management Function (AMF).

In examples, communications between the elements illustrated in FIG. 1 can proceed via any number of intervening elements, including no intervening elements.

Figure 2:
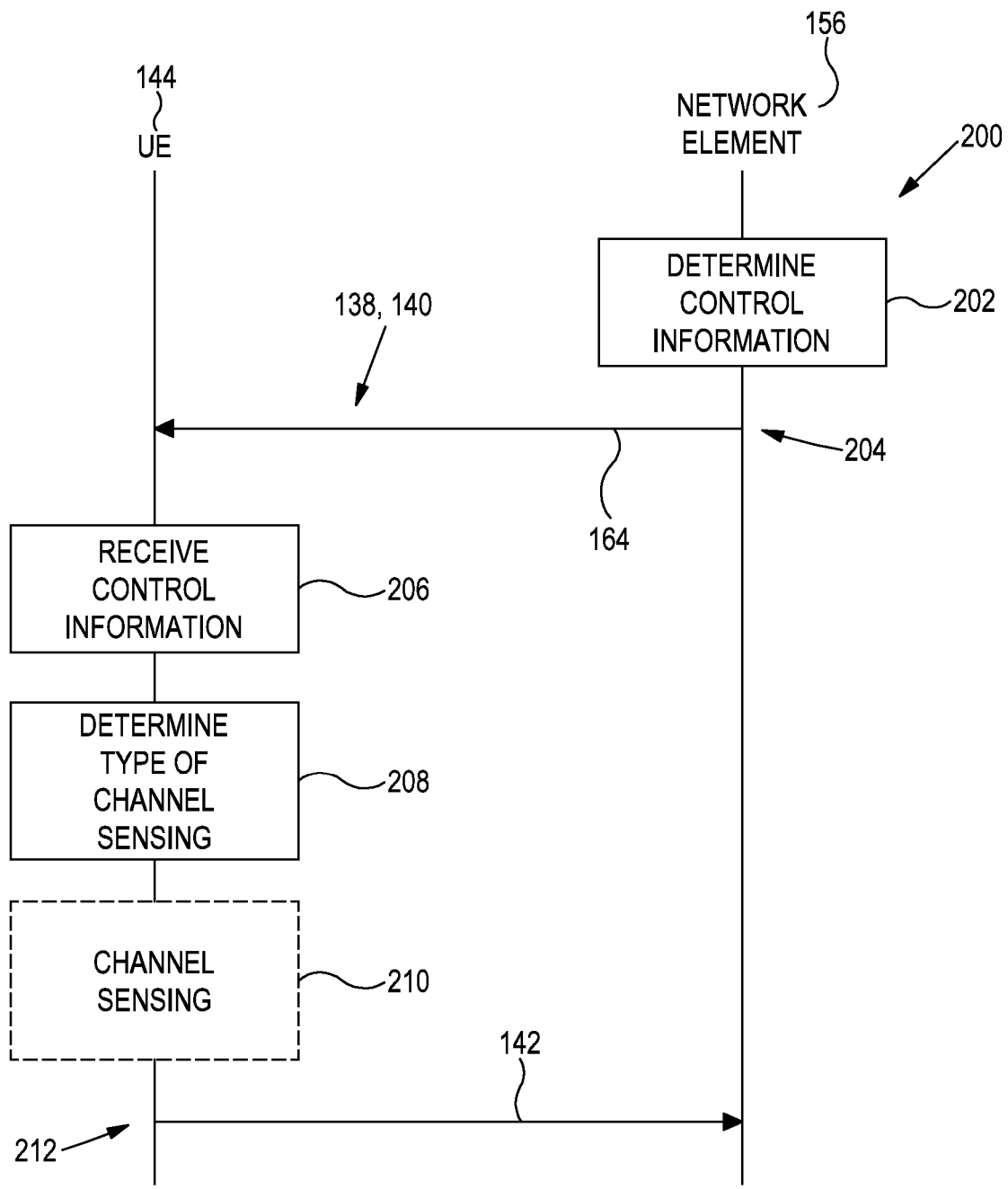
FIG. 2 shows an example of the subject matter described herein.

FIG. 2 illustrates an example of a method 200.

In the example of FIG. 2, a plurality of apparatuses communicate across a network. In examples, any suitable form of communication in any suitable network setup can be used. For example, at least a portion of the network 100 of FIG. 1 can be used.

In the illustrated example, a terminal node 110 is communicating with a network element 156, which can be considered an access node 120 and/or server 156. In the example of FIG. 2 the terminal node 110 is user equipment (UE) 144 and the access node 120 is a gNodeB (gNB) 156.

In examples, the communications between the elements illustrated in FIG. 2 can proceed via any number of intervening elements, including no intervening elements.

Although one UE 144 is illustrated in the example of FIG. 2, in examples any suitable number of UEs 144 can be included. For example, any suitable number of UEs 144 can be in communication with the gNB 156.

Similarly, in examples, any suitable number of network elements can be included.

One or more of the features discussed in relation to FIG. 2 can be found in one or more of the other figures.

At block 202, the method 200 comprises determining control information 138 including a slot format indicator (SFI) 140 configured to indicate scheduled channel usage for time units 146, wherein the slot format indicator includes at least one indicator 150 configured to indicate that simultaneous uplink and downlink communications are scheduled to occur on a shared channel 148 in at least one of the time units 146.

In examples, the control information 138 comprises at least one SFI 140.

In some examples, the control information 138 can be considered to include information for use in controlling channel sensing type selection prior to one or more uplink transmissions 142 by at least one UE 144, in one or more time units 146, using at least a portion of the shared channel 148.

In some examples, controlling channel sensing can be considered controlling determination as to whether at least part of the shared channel 148 is busy. For example, a part of the shared channel 148 that is scheduled to be used for the uplink transmission 142.

In some examples, channel sensing can be considered attempting to detect and/or listening for conflicting or potentially conflicting transmissions on the shared channel 148.

Accordingly, in some examples, controlling channel sensing can be considered to comprise, or be, controlling how a UE 144 attempts to detect and/or listen for conflicting or potentially conflicting transmissions on the shared channel 148.

In examples any suitable form of controlling channel sensing can be used. For example, controlling channel sensing for any suitable duration and/or over any suitable frequency span or spans can be used.

For example, controlling channel sensing to be performed over the frequency span of the shared channel 148 or, in some example, over a subset of frequencies of the shared channel 148.

In examples, controlling channel sensing can comprise controlling selection of a type from a plurality of predetermined types of channel sensing, having, for example, different durations and/or frequency coverage.

In some examples, controlling channel sensing can comprises controlling determination of a type of listen-before-talk (LBT) to use.

As used herein, the term "determining" (and grammatical variants thereof) can include, not least: calculating, computing, processing, deriving, investigating, looking up (for example, looking up in a table, a database or another data structure), ascertaining and the like. Also, "determining" can include receiving (for example, receiving information), accessing (for example, accessing data in a memory) and the like. Also, "determining" can include resolving, selecting, choosing, establishing, and the like.

In examples, the control information 138 can have any suitable form and can be determined in any suitable way using any suitable method.

In some examples, a gNB 156 can decide the contents of the SFI 140 based on the expected traffic on the shared channel 148 in the upcoming time units 146.

For example, if there is only downlink traffic in a time unit 146, which in some examples can be referred to as a symbol, the gNB 156 can mark the time unit 146 as DL only. If there is only uplink traffic in a time unit 146, the gNB 156 can mark the time unit 146 as UL only. If there is simultaneous UL and DL in a time unit 146, the gNB 156 can mark the time unit 146 as simultaneous DL and UL.

If the gNB does not know yet what traffic will occur in a time unit 146 the gNB can mark the time unit 146 as flexible, which can, for example, mean either UL or DL.

In some examples, the control information 138 can be considered to be or comprise scheduling information.

In some examples, the control information 138 can be considered to be configured for use in controlling one or more uplink transmissions 142 by at least one user equipment 144.

For example, the control information 138 can be, at least, configured for use in determining whether one or more uplink transmissions 142 by the at least one user equipment 144 can proceed.

In examples determination of a type of channel sensing to use prior to initiating an uplink can determine whether the uplink transmission 142 can proceed.

In examples an uplink transmission can be considered an uplink communication.

In examples, the time period over which transmissions on the channel 148 are scheduled is split up into the time units 146. See, for example, FIGS. 4 and 5.

For example, at least a portion of the time period to which the control information 138 applies can be split up into a number of time units 146.

In examples, the time units 146 can have any suitable duration or durations. For example, the time units 146 can have a duration in the range 4 microseconds to 72 microseconds.

In some example, time unit 146 duration can depend on the specifics of the system.

For example, for orthogonal frequency division multiplexing (OFDM) based systems with carrier spacing of 15 KHz to 240 KHz, the duration of the time units 146 would correspond to 72 microseconds and 4 microseconds respectively.

In examples, the time units 146 can be considered at least a portion of one or more slots. In examples, the time units 146 can be referred to as symbols, such as OFDM symbols.

In the example of FIG. 2 the channel 148 is a shared channel 148. In examples the channel 148 can be considered to be shared because it is configured and/or assigned for both uplink and downlink transmissions and/or communications.

In examples, the channel 148 can be referred to as a channel allocated in an unlicensed band or an unlicensed channel 148.

The channel 148 can, in some examples, be considered a shared band of spectral frequencies.

In some examples, the control information 138 comprises at least one reference to a data structure.

For example, the slot format indicator 140 can comprise a pointer towards a slot format combination in a data structure of slot format combinations.

In such examples, the indicated slot format combination can include the at least one indicator 150 configured to indicate that simultaneous uplink and downlink communications are scheduled to occur on the channel 148 in at least one of the time units 146 covered by the slot format indicator 140.

However, in some examples, the slot format indicator 140 can be or comprise the slot format combination. Accordingly, in some examples, the control information 138 can comprise the slot format combination.

In general, the slot format indicator 140 can have any suitable form to indicate scheduled channel usage for time units 146, which can, in some examples, be considered a plurality of time units 146. In examples the time units 146 can be considered the time units covered by the slot format indicator 140 and/or the time units of the slot format indicator 140 and so on.

In examples, the slot format indicator 140 can be considered to be information configured for use in controlling channel sensing type selection prior to one or more uplink transmissions 142 by at least one UE 144.

In examples, the slot format indicator 140 is configured to indicate the type of duplexing scheduled to occur in the time units 146 covered by the slot format indicator 140. For example, the slot format indicator 140 can be configured to indicate at least uplink only, downlink only, flexible or simultaneous uplink and downlink on the shared channel

148 for the time units 146. In examples, flexible means that the shared channel 148 can be used for downlink or uplink according to the schedule.

In some examples, the slot format indicator 140 comprises information configured to indicate, at least, downlink, uplink, flexible, or simultaneous uplink and downlink on the shared channel 148 for the time units 146 covered by the slot format indicator 140. See, for example, FIG. 4.

The control information 138 can comprise information configured to indicate what proportion of the shared channel 148 is scheduled to be used for uplink and/or downlink in the time units 146 covered by the slot format indicator 140, including time units 146 scheduled for simultaneous uplink and downlink on the shared channel.

In examples, any suitable indication of what proportion of the shared channel 148 is scheduled for uplink and/or downlink in the time units 146 can be used.

In some examples, the slot format indicator 140 can comprise information configured to indicate what proportion of the shared channel 148 is scheduled for uplink and/or downlink in the time units 146 covered by the slot format indicator 140.

For example, the slot format indicator 140 can comprise a reference, such as a pointer, to a slot format combination configured to indicate the scheduled uplink and/or downlink proportions for the time units 146.

Accordingly, in examples, the slot format indicator 140 comprises, for the time units 146, an indication of a proportion of the shared channel 148 scheduled for uplink and/or downlink, including time units 146 scheduled for simultaneous uplink and downlink on the shared channel 148.

In some examples, the slot format indicator 140 comprises, for the time units 146, an indication of the location of a guard band 152 in the shared channel 148. Any suitable indication of the location of the guard band 152 in the shared channel 148 can be used.

In examples, the frequencies of the shared channel 148 can be split into a number of sections and an indication of the section or sections to contain uplink transmission(s), downlink transmission(s) or the guard band 152 provided. See, for example, FIG. 5.

In examples sections can be considered subcarriers, physical resource blocks, chunks, and/or portions, and/or parts and/or sub-bands and so on.

In the illustrated example, simultaneous uplink and downlink communications or transmissions are scheduled to occur on the shared channel 148 in at least one of the time units 146 covered by the slot format indicator 140.

Accordingly, in the illustrated example, the slot format indicator 140 includes at least one indicator 150 configured to indicate that simultaneous uplink and downlink communications are scheduled to occur on the shared channel 148 in at least one of the time units 146.

In examples, simultaneous uplink and downlink transmissions can be considered uplink and downlink transmissions on the shared channel 148 that at least partially overlap in time.

For example, simultaneous uplink and downlink transmissions can be considered uplink and downlink transmissions that occur in at least one shared channel 148.

In examples simultaneous uplink and downlink transmissions on the shared channel 148 are configured to occur on different, non-overlapping portions of the shared channel 148. For example, flexible frequency division duplexing can be used on the shared channel 148.

At block 204, at least one signal 164 is transmitted from the gNB 156 to the UE 144. In the illustrated example, the at least one signal 164 comprises the control information 138 including the slot format indicator 140. The control information 138 can be considered as a downlink control information and the control information includes, in examples, scheduling information for transmitting/receiving data.

As FIG. 2 illustrates one or more actions of transmission of one or more signals 164 between the UE 144 and the network element 156, FIG. 2 also illustrates the corresponding transmitting/causing transmitting feature.

Similarly, for any transmitting/causing transmitting feature FIG. 1 also illustrates the corresponding receiving/causing receiving action.

For example, block 204 also illustrates receiving/causing receiving at least one signal 164 from the network element 156.

Consequently, FIG. 2 illustrates a method 200 comprising: determining control information 138a slot format indicator 140 configured to indicate scheduled channel usage for time units 146, wherein the slot format indicator includes at least one indicator 150 configured to indicate that simultaneous uplink and downlink communications are scheduled to occur on a shared channel 148 in at least one of the time units 146; and causing transmission of the control information 138 to at least one user equipment 144.

In examples, the control information 138 is comprised in downlink control information, DCI.

At block 206, the method 200 comprises receiving the control information 138 including a slot format indicator 140. Accordingly, in examples, block 204 and block 206 can be considered to be at least partially combined.

The received control information can be as described in relation to block 202.

Block 206 therefore illustrates receiving control information 138 including a slot format indicator 140 configured to indicate scheduled channel usage for time units 146, wherein the slot format indicator includes at least one indicator 150 configured to indicate that simultaneous uplink and downlink communications are scheduled to occur on a shared channel 148 in at least one of the time units 146.

At block 208, the method 200 comprises determining a type of channel sensing to use prior to initiating an uplink transmission 142 on at least a portion, or part, of the shared channel 148 based, at least in part, on the control information 138.

In the illustrated example, determining a type of channel sensing to use comprises analysing the scheduled channel usage for, at least, the time unit 146 in which the uplink transmission 142 is scheduled to be initiated and the time unit 146 before the time unit 146 in which the uplink transmission is scheduled to be initiated.

In examples, channel sensing can be considered channel scanning.

In some examples, channel sensing can be considered determining if at least part of the shared channel 148 is busy. For example, a part of the shared channel 148 that is scheduled to be used for the uplink transmission 142.

In some examples, channel sensing can be considered attempting to detect and/or listening for conflicting or potentially conflicting transmissions on the shared channel 148.

In examples any suitable form of channel sensing can be used. For example, channel sensing for any suitable duration and/or over any suitable frequency span can be used.

For example, channel sensing can be performed over the frequency span of the channel 148 or, in some example, over a subset of frequencies of the channel 148.

In examples, determining a type of channel sensing to use can therefore be considered determining a frequency range (or ranges) to sense/scan and/or determining a duration of the sensing/scanning.

Determining a type of channel sensing to use can comprise selecting a type from a plurality of predetermined types of channel sensing, having, for example, different durations and/or frequency coverage.

In some examples, determining a type of channel sensing to use comprises determining a type of listen-before-talk (LBT) to use.

In examples, channels sensing type selection can comprise selecting from at least the following options:
- Type 1 (Cat4 LBT)—for example, for UL transmissions outside the gNB-acquired channel occupancy time (COT).
- Type 2A (25 microseconds Cat2 LBT)—for example, for UL transmissions within the gNB-acquired COT (for example, in case the DL-UL gap is ≥25 microseconds, as well for UL transmission following another UL transmission)
- Type 2B (16 microseconds Cat2 LBT)—for example, for UL transmission within the gNB-acquired COT (for example, can be used for UL transmissions following DL with a DL-UL gap exactly equal to 16 microseconds)
- Type 2C (no UL LBT)—for examples, can be used for UL transmission following DL, with DL-UL gap s 16 microseconds and duration of the UL transmission ≤584 microseconds)

In examples, determining a type of channel sensing to use comprises determining a type of channel sensing to use prior to initiating an uplink transmission in a time unit 146 in which simultaneous uplink and downlink communications are scheduled to occur on the shared channel 148. See, for example, FIG. 4.

In some examples, determining a type of channel sensing to use comprises determining not to use channel sensing prior to initiating the uplink transmission 142.

Accordingly, in some examples the uplink transmission 142 can proceed without channel sensing being performed.

In examples determining a type of channel sensing to use comprises:
- determining, from for example the scheduled channel usage, if a part of the shared channel 148 is scheduled for downlink transmissions in at least one of the time units 146 before the time unit 146 in which the uplink transmission 142 is scheduled to be initiated; and
- determining, from for example the scheduled channel usage, if a part of the shared channel 148 is scheduled for simultaneous uplink and downlink transmissions in the time unit 146 in which the uplink transmission 142 is scheduled to be initiated; and
- if it is determined that the part of the shared channel 148 is scheduled for downlink transmissions in at least one of the times unit 146 before the time unit 146 in which the uplink transmission is scheduled to be initiated and it is determined that the part of the shared channel 148 is scheduled for simultaneous uplink and downlink transmissions in the time unit 146 in which the uplink transmission is scheduled to be initiated, determining not to use channel sensing prior to initiating the uplink transmission 142.

In examples, determining a type of channel sensing to use comprises:
- determining if the shared channel 148 is scheduled for downlink transmissions in the time unit 146 before the time unit 146 in which the uplink transmission 142 is scheduled to be initiated; and
- determining if the shared channel 148 is scheduled for simultaneous uplink and downlink transmission in the time unit 146 in which the uplink transmission 142 is scheduled to be initiated; and
- if it is determined that the shared channel 148 is scheduled for downlink transmissions in the time unit 146 before the time unit 146 in which the uplink transmission is scheduled to be initiated and it is determined that the shared channel 148 is scheduled for simultaneous uplink and downlink transmissions in the time unit 146 in which the uplink transmission is scheduled to be initiated, determining not to use channel sensing prior to initiating the uplink transmission 142.

Accordingly, in such examples, the uplink transmission 142 can proceed without any prior channel sensing if it is determined that the shared channel 148 is scheduled for simultaneous uplink/downlink in the initiation time unit 146 and scheduled for downlink in the preceding time unit 146.

For example, uplink transmission without prior channel sensing can be allowed by regulations governing transmissions on the channel 148, in certain circumstances.

In some examples, determining a type of channel sensing to use comprises: determining if the shared channel 148 is scheduled for simultaneous uplink and downlink transmissions in time unit or units 146 in which the uplink transmission 142 is scheduled to occur immediately after the time unit 146 in which the uplink transmission 142 is schedules to be initiated; and
- if it is determined that the shared channel is scheduled for simultaneous uplink and downlink transmissions in time unit or units 146 in which the uplink transmission is scheduled to occur immediately after the time unit in which the uplink transmission is scheduled to be initiated, determining not to use channel sensing prior to initiating the uplink transmission 142.

Accordingly, in such examples, the uplink transmission 142 can proceed without any prior channel sensing if it is determined that the shared channel 148 is scheduled for simultaneous uplink/downlink for the duration of the scheduled uplink transmission 142.

In some examples, it is determined not to use channel sensing prior to initiating the uplink transmission 142 if it is determined that the shared channel 148 is scheduled for downlink in the time unit 146 before the time unit 146 in which the uplink transmission 142 is scheduled to be initiated and it is determined that the shared channel 148 is scheduled for simultaneous uplink/downlink for, at least, the scheduled duration of the uplink transmission 142.

Accordingly, in examples, based, at least in part, on the received control information 138 it can be determined that the uplink transmission 142 can proceed without prior channel sensing.

As discussed in relation to block 202, in examples the slot format indicator 140 of the control information 138 comprises an indication of a proportion of the shared channel 148 scheduled for uplink and/or downlink.

In some examples, determining a type of channel sensing to use comprises determining the frequency width of the shared channel 148 scheduled for download transmissions in the time unit 146 in which the uplink transmission is scheduled to be initiated and determining not to use channel sensing prior to initiating the uplink transmission if the frequency width of the shared channel scheduled for download transmissions is greater than or equal to a predetermined value.

Any suitable predetermined frequency width value can be used. In examples a predetermined frequency width as a percentage of the shared channel size can be used.

In some examples the predetermined value of the predetermined frequency width value can be in the range 2 MHz to 20 MHz.

The shared channel 148 can, in examples, be 20 MHz wide, and in such examples some form of channel sensing would be indicated for a predetermined value of 20 MHz.

The predetermined value of the predetermined frequency width value can be in the range 10% to 100% of the shared channel width.

In some examples determining a form of channel sensing to use comprises:
  determining a duration of the uplink transmission 142; and
  determining not to use channel sensing prior to initiating the uplink transmission 142, if the duration of the uplink transmission is less than a predetermined value.

Any suitable predetermined duration value can be used. In examples the predetermined value can be in the range 500 to 600 microseconds. In some examples, the predetermined duration can be 584 microseconds.

In examples the control information 138 comprises information indicating the UEs 144 involved in scheduled uplink and downlink transmissions with the network element 156. See, for example, FIG. 4.

In some examples determining a form of channel sensing to use comprises:
  determining if the downlink transmission or transmissions scheduled in the time unit or units 146 in which the uplink transmission 142 is scheduled to occur is directed towards the UE 144 scheduled to transmit the uplink transmission 142; and
    determining not to use channel sensing if it is determined that the downlink transmission or transmissions scheduled in the time unit or units 146 in which the uplink transmission 142 is scheduled to occur is directed towards the UE 144 scheduled to transmit the uplink transmission.

In some examples, it is determined not to use channel sensing for uplink transmissions 142 greater than the predetermined duration if it is determined that the downlink transmission or transmissions scheduled in the time unit or units 146 in which the uplink transmission 142 is scheduled to occur is directed towards the UE 144 scheduled to transmit the uplink transmission 142.

In the examples described above it can be determined not to use channel sensing prior to an uplink transmission 142 on the shared channel 148 under different circumstances.

However, in examples, determining a form of channel sensing to use can comprise determining to perform partial sensing of the shared channel 148.

For example, determining the form of channel sensing to use, in some examples, comprises:
  determining if the shared channel 148 is scheduled for simultaneous uplink and downlink in, at least, the time unit 146 in which the uplink transmission 142 is scheduled to be initiated; and
  if it is determined that the shared channel 148 is scheduled for simultaneous uplink and downlink in, at least, the time unit 146 in which the uplink transmission 142 is scheduled to be initiated, determining not to perform channel sensing on the portion or portions of the shared channel 148 scheduled for downlink in the time unit 146 in which the uplink transmission 142 is scheduled to be initiated.

For example, portions of the shared channel 148 determined not to be scheduled for use in downlink can be sensed or scanned.

At block 210, the method 200 comprises causing performance of and/or performing the determined type of channel sensing prior to initiating the uplink transmission 142.

However, in examples where it is determined not to perform channel sensing prior to the uplink transmission 142, channel sensing is not performed at block 210.

Accordingly, block 210 is illustrated with a dashed line.

At block 212 the method 200 comprises causing transmission of/transmitting the uplink transmission 142 in the form of one or more signals.

Accordingly, FIG. 2 also illustrates causing reception of/receiving one or more uplink transmissions by the network element 156 from one or more of the at least one UE 144.

Consequently, FIG. 2 illustrates a method comprising:
  receiving control information 138 including a slot format indicator 140 configured to indicate scheduled channel usage for time units 146, wherein the slot format indicator includes at least one indicator 150 configured to indicate that simultaneous uplink and downlink communications are scheduled to occur on a shared channel 138 in at least one of the time units 146; and
  determining a type of channel sensing to use prior to initiating an uplink transmission 142 on at least a portion of the shared channel 148 based, at least in part, on the control information 138, wherein determining a type of channel sensing to use comprises analysing the scheduled channel usage for, at least, the time unit 146 in which the uplink transmission 142 is scheduled to be initiated and the time unit 146 before the time unit 146 in which the uplink transmission 142 is scheduled to be initiated.

Examples of the disclosure are advantageous. For example, examples of the disclosure provide for initiating uplink transmission on part of a shared channel not to be prevented by channel sensing detecting downlink transmissions on a different part of the shared channel.

Furthermore, examples of the disclosure provide for continuous downlink transmissions on a first part of a shared channel and downlink to uplink switch on a second part of the same shared channel.

Continuous downlink transmission can be considered to mean there are no gaps introduced between two consecutive downlink transmissions on the first part of the shared channel.

Figure 3:
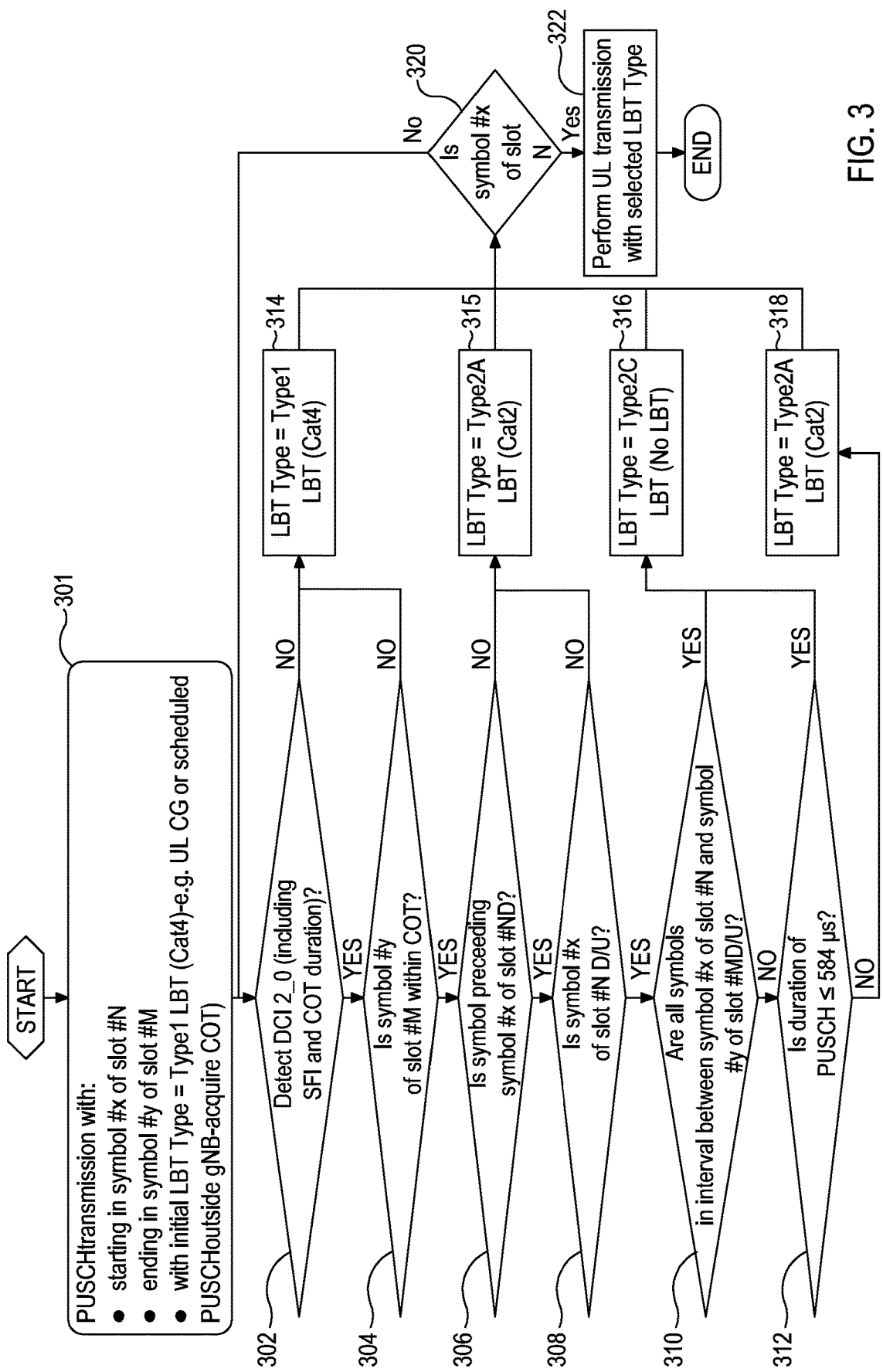
FIG. 3 shows an example of the subject matter described herein.

FIG. 3 illustrates an example of a method 300.

In examples, the method 300 can be performed by any suitable apparatus comprising any suitable means for performing the method 300.

In some examples the method 300 can be performed by a UE 144, such as a UE 144 of FIG. 1 and/or FIG. 2.

Some examples relate to third generation Partnership Project (3GPP) network. FIG. 3 can be considered to illustrate some such examples.

As indicated in block 301, in the example FIG. 3 a UE has Physical Uplink Shared Channel (PUSCH) resources allocated.

In the example of FIG. 3 the PUSCH resources can be uplink (UL) configured grant (CG) resources or scheduled PUSCH resources outside the gNB channel occupancy time (COT).

In the illustrated example the UE has a scheduled PUSCH transmission starting in OFDM symbol #x of slot #N and ending in ODM symbol #y of slot #M. In examples N can equal M.

The listen-before-talk (LBT) type is initially set to Type 1 LBT. The LBT is one of channel sensing.

At block 302 the UE monitors search spaces for receiving Physical Downlink Control Channel (PDCCH) downlink control information (DCI) format 2_0 carrying information on the SFI 140 and the COT duration.

If no PDCCH DCI Format 2_0 with information on SFI 140 and COT duration is detected before the PUSCH starting position, that is OFDM symbol #x of slot #N, the method 300 proceeds to block 322, via blocks 314 and 320 and the UE 144 attempts PUSCH transmission with Type 1 LBT (Cat 4).

If PDCCH DCI Format 2_0 including SFI 140 and COT duration is detected at block 302, the method 300 proceeds to block 304.

At block 304 the method 300 comprises determining if the PUSCH transmission is not within COT, for example whether symbol #y of slot #M is within COT or not.

If it is determined that the PUSCH transmission is not within COT, the method proceeds to block 322 via blocks 314 and 320 and the UE 144 attempts PUSCH transmission with Type 1 LBT (Cat 4).

If it is determined that PUSCH transmission is within COT the method proceeds to block 306.

At block 306, the method 300 comprises determining if the symbol preceding the first symbol of the PUSCH transmission indicates download only (D).

If it is determined that the symbol preceding the first symbol of the PUSCH is not D, the method 300 proceeds to block 322 via blocks 315 and 320 and the UE 144 attempts PUSCH transmission with Type 2A LBT (Cat 2). That is, the UE 144 performs channel sensing by using Type 2A LBT, and the UE 144 transmits the PUSCH at the symbol #4 of the slot N, if the channel has been determined not occupied by other entities.

If it is determined that the symbol preceding the first symbol of the PUSCH is D, the method 300 proceeds to block 308.

At block 308, the method 300 comprises determining if the first symbol of the PUSCH transmission indicated simultaneous downlink and uplink (D/U).

If it is determined that the first symbol of the PUSCH transmission is not D/U, the method 300 proceeds to block 322 via blocks 315 and 320 and the UE 144 attempts PUSCH transmission with Type 2A LBT (Cat 2).

If it is determined that a type of the first symbol of the PUSCH transmission is D/U the method proceeds to block 310.

At block 310, the method 300 comprises determining if all symbols of the PUSCH transmission are D/U.

If it determined that all symbols of the PUSCH transmission are D/U the method 300 proceeds to block 322 via blocks 316 and 320 and the UE performs PUSCH transmission with Type 2C LBT (no LBT). That is, if all type of the OFDM symbols of the PUSCH transmission are D/U, the UE performs a channel sensing with Type 2C LBT (that is, the UE does not perform the channel sensing) and then transmits the PUSCH on the part of the shared channel 148.

If it is determined that all symbols of the PUSCH transmission are not D/U, the method 300 proceeds to block 312. For example, some symbols of the PUSCH transmission from symbol #x of slot #N are D/U and the other symbols of the PUSCH transmission are U, the method 300 proceeds to block 312.

At block 312, the method comprises determining if the duration of the PUSCH transmission is less than or equal to 584 microseconds.

If it is determined that the duration of the PUSCH is less than or equal to 584 microseconds, the method 300 proceeds to block 322 via blocks 316 and 320 and the UE performs PUSCH transmission with Type 2C LBT (no LBT). That is to say, the UE 144 performs no LBT (Type 2C LBT) and performs UL transmission from symbol #x of slot #N to symbol #y of slot #M.

If it is determined that the duration of the PUSCH transmission is greater than 584 microseconds, the method 300 proceeds to block 322 via blocks 318 and 320 and the UE 144 attempts PUSCH transmission with Type 2A LBT (Cat 2). In examples, the UE 144 performs type 2A LBT and performs the PUSCH transmission after determination that the shared channel 148 is clear for the transmission.

At blocks 314, 315, 316 and 318, the LBT type is determined as one of them, and at block 320 it is determined if the starting symbol of the PUSCH transmission has been reached.

If so, the method 300 proceeds to block 322 and the UE 144 attempts or performs UL transmission with selected LBT type.

Otherwise the method 300 returns to block 302.

In some examples method 300 can be summarized as follows:

---

IF (no PDCCH DCI Format 2_0 with information on SFI and COT duration is detected by the UE 144 before the PUSCH starting position (i.e. symbol #x of slot #N))
- the UE attempts PUSCH transmission with LBT type = Type 1 LBT (Cat4)

ELSE
  IF (PUSCH transmission is NOT within the COT)
- the UE attempts PUSCH transmission with LBT type = Type 1 LBT (Cat4)

ELSE
    IF (the symbol preceding the first symbol of the PUSCH transmission is D) AND (the first symbol of the PUSCH transmission is D/U) AND ((all symbols of the PUSCH transmissions are D/U) OR (the duration of the PUSCH transmission is ≤ 584 µs))
- the UE performs PUSCH transmission with LBT type = Type 2C LBT (no LBT)

```
        ELSE
                -   the UE attempts PUSCH transmission with LBT type = Type
                    2A LBT (Cat2)
            END
    END
END
```

Alternatively, Type 2C LBT is only allowed if the D transmission in symbol #x of slot #N (D/U) is occupying at least X MHz. In examples X can be 50 MHz or 40 PRBs.

Alternatively, Type 2C LBT is only allowed if the UL transmission is less than or equal to 584 microseconds.

Alternatively, if the symbol preceding symbol #x of slot #N is D and symbol #x of slot #N is D/U, and the UL transmission is greater than 584 microseconds, Type 2A LBT is performed only on the portion of the shared channel 148 that is not used for DL transmission in symbol #x of slot #N.

In examples, one or more of the following examples can apply to 3GPP examples, for example the method 300 of the example of FIG. 3.

In examples, the gNB explicitly informs the radio resource control (RRC) connected UEs 144 within its cell of which type of duplexing is occurring at each symbol.

In examples, the UEs 144 in the cell are informed via a dedicated group-common DCI, which includes the slot format information 140.

In examples, this may be signaled using a new SFI format, which identifies if a symbol is DL only, UL only, Flexible, or simultaneous uplink and downlink (U/D) In examples a new DCI format is introduced for the case of flexible frequency division duplexing (FFDD) in order to ensure backward compatibility (for example, in the case that time division duplexing (TDD) and FFDD coexist in the same spectrum).

Alternatively, in some examples, DCI format 2_0 could be extended in backward compatible mode to include information of duplexing type per symbol.

In examples, a UE 144 with an UL allocation within the gNB acquired COT can initiate transmission on the allocated UL resources without performing LBT if, based on the information signaled by the gNB, it determines that the gNB is also transmitting in the DL direction in the symbol preceding the UL transmission 142, and at least during the first symbol of the UL transmission 142.

In examples, the presence of the U/D tag indicates to the UE that there is DL transmission and UL transmission are allocated at the same time unit. See, for example, FIG. 4.

In examples, if the first symbol of a PUSCH transmission is U/D and the previous symbol is D, the UE can apply Type 2C LBT as a channel sensing.

In examples, Type 2C LBT can be applied independently of the PUSCH starting position and value of the timing advance (TA), that is, also if the gap between DL and UL on the portion of the shared channel, which can be shared and/or unlicensed, where the PUSCH transmission occurs is greater than 16 microseconds.

In some examples, the UE can apply Type 2C LBT only if the first symbol of the PUSCH transmission is U/D and the previous symbol is D, and the DL part of the U/D symbol is at least X MHz wide. In case the DL part is less than X MHz, Type 2A LBT may be applied.

In examples X is in the range 2 to 20 MHz.

In some examples, Type 2C LBT can be used also in case the UL transmission following a D symbol and starting in a U/D symbol is greater than 584 microseconds (still within the gNB-acquired COT) if all the time resources of the PUSCH transmission are indicated as U/D (that is, if the gNB is also transmitting in DL while the UE is transmitting in UL).

In examples, Type 2C LBT for UL transmissions greater than 584 microseconds and which are overlapping (in channel and time domain) with a DL transmission from the initiating device (gNB) is allowed if the DL transmission is directed to the same UE 144 that is simultaneously transmitting in UL.

In some examples, when Type 2A LBT is applied prior to an UL transmission greater than 584 microseconds and which is overlapping (in channel and in time domain) with a DL transmission from the initiating device (gNB), the channel sensing is allowed to be performed during gNB silent periods in both time and frequency domain (that is, on the portion of the 20 MHz channel where DL is not transmitted).

In some examples, instead of performing Type 2A LBT when the duration of an UL transmission is greater than 584 microseconds, the UE 144 can also perform channel sensing prior to the UL transmission 142 in order to identify potential hidden nodes.

In examples, the UE 144 tracks variations of the Rx power during DL transmission(s) preceding the UL transmission opportunity. If the UE 144 detects a substantial increase in Rx power (larger than a threshold), the UE 144 drops the UL transmission 142. The Rx power larger than a threshold indicating the presence of a hidden node. Otherwise, it can initiate the PUSCH transmission without performing any additional LBT check.

In examples, the proposed method is applicable to UL configured grant allocations, where the UE 144 is assigned periodic semi-static PUSCH resources, and therefore the gNB 156 cannot indicate the LBT type when allocating the PUSCH resources.

In examples, the proposed method can also apply to scheduled PUSCH transmission, for example scheduled PUSCH transmission outside the gNB-acquired COT.

Figure 4:
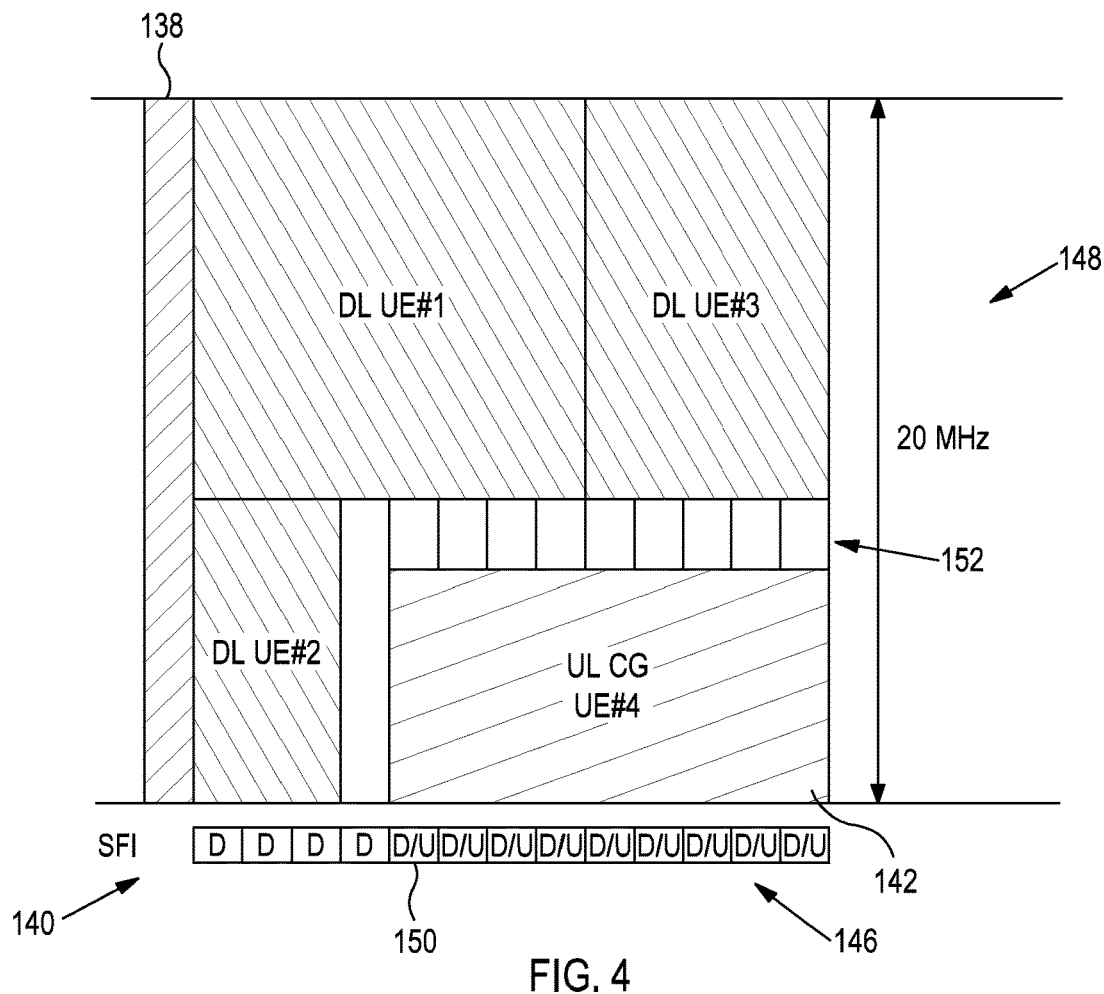
FIG. 4 shows an example of the subject matter described herein.

FIG. 4. Illustrates an example scenario.

FIG. 4 schematically shows scheduling on a shared channel 152 for a time units 146.

FIG. 4 also shows an example of a slot format indicator 140 and/or information indicated by a slot format indicator 140.

In the example of FIG. 4 the control channel 138 and the shared channel 148 are 20 MHz wide.

As illustrated in the block occupying the leftmost, or first, time unit 146, control information 138 is transmitted/received via a physical downlink control channel (PDCCH). In examples the control information 138 is comprised in DCI via PDCCH.

In the example of FIG. 4 downlink resources are scheduled on the shared channel 148 in the first four time units 146 (going left to right) of the SFI 140.

In the example, downlink transmissions to UE #2 and UE #1 are scheduled in these time units 146.

However, the downlink transmission to UE #2 is scheduled to end in the third time unit 146, and that portion of the shared channel 148 forms guard band 152 in the fourth time unit 146.

In the illustrated example, the remaining time units 146 are scheduled for simultaneous uplink and downlink as indicated by the D/U in the SFI 140.

Accordingly, FIG. 4 illustrates an SFI 140 including at least one indicator 150 configured to indicate that simultaneous uplink and downlink communications are scheduled to occur on the shared channel 148 in at least one of the time units 146.

In the example of FIG. 4, continuous downlink transmissions to UE #1 and UE #3 are scheduled on a first part of the shared channel 152 at the same time as an uplink transmission 142 by UE #4.

In examples, UE #4 can determine not to perform channel sensing prior to initiating the uplink transmission 142 by analysing the scheduled channel usage for, at least, the time unit 146 in which the uplink transmission 142 is scheduled to be initiated and the time unit 146 before the time unit 146 in which the uplink transmission 142 is scheduled to be initiated. In examples, the uplink transmission 142 can be an uplink transmission 142 as illustrated at block 212 of FIG. 2.

These time units 146 are highlighted in the example of FIG. 4.

Accordingly, in the example of FIG. 4, the uplink transmission by UE #4 can proceed without channel sensing and is not affected by the ongoing downlink transmission on another part of the shared channel 152.

Without the inventive method disclosed herein, the uplink transmission 142 by UE #4 would be prevented by channel sensing prior to initiating the uplink transmission 142 which would detect the ongoing downlink transmission.

In examples, the downlink transmissions can be via physical downlink shared channel (PDSCH) and the uplink transmissions 142 can be physical uplink shared channel (PUSCH).

Figure 5:
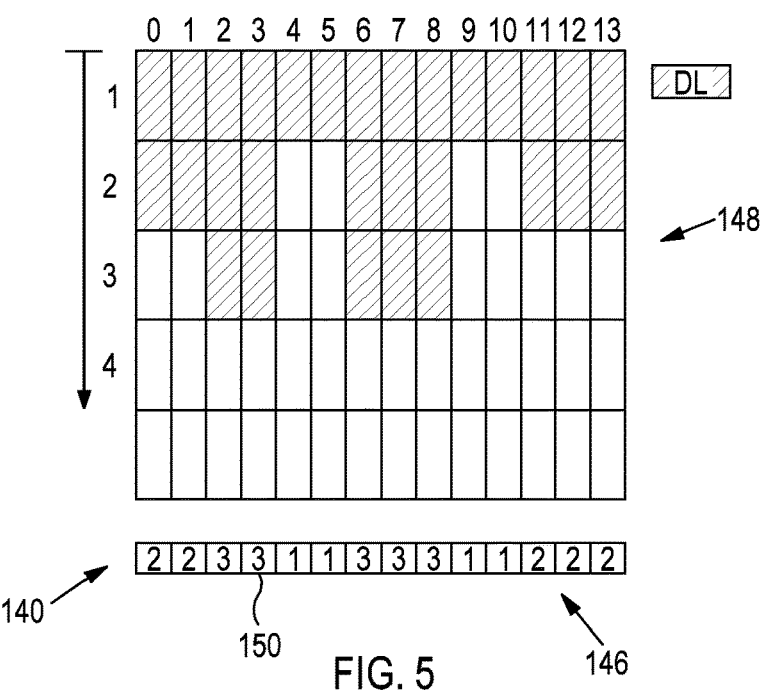
FIG. 5 shows an example of the subject matter described herein.

FIG. 5 illustrates an example of an SFI 140 format.

In the example of FIG. 5 the shared channel 148 is partitioned into a plurality of chunks or sections. The number of chunks or sections can, in examples, be indicated in the system information block (SIB).

In the associated SFI 140 (or information indicated by the SFI 140) there is an indication, for the time units 146, of the downlink allocation on the shared channel 148 in connection with a starting reference.

In the example of FIG. 5 the allocation is indicated from the start of the band width part (BWP).

In the example of FIG. 5, the chunks allocated for downlink are shaded.

Accordingly, in the first time unit 146 (from the left) a 2 is indicated to show that 2 chunks from the start of the BWP are allocated for downlink.

Similarly, the next time unit 146 shows 2 chunks and the time unit 146 after that shows 3 chunks and so on.

Accordingly, in this example, a proportion of the shared channel 148 scheduled for downlink and uplink can be indicated, as the size of a guard band between the different portions can be predetermined.

Alternatively, in some examples, the SFI format can reflect instead the UL allocation.

In some examples, the location of the guard band 152 separating the UL and DL allocations can be used in the SFI 140 to indicate the resource allocation.

In examples, the partition of the BWP can be made at the symbol level (as depicted in FIG. 5) or it can be at the slot (or multiple slots) level. In later case, the DL, GB or UL allocation in the BWP is required.

With this later approach, the signaling overhead is greatly reduced, albeit at the cost that dynamic allocation at the multiple slot level can only be updated after these have elapsed.

A technical benefit provided by the disclosure is preventing disruption to uplink transmission on part of a shared channel by channel sensing detecting downlink transmissions on a different part of the shared channel.

Furthermore, examples of the disclosure provide for continuous downlink transmissions on a first part of a shared channel and downlink to uplink switch on a second part of the same shared channel.

Figure 6A:
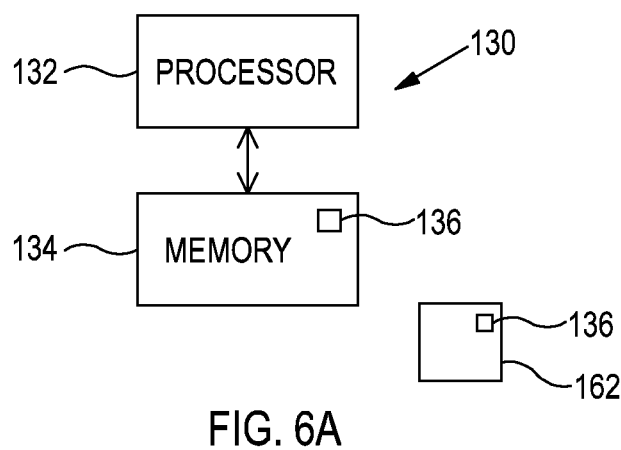
FIG. 6A shows an example of the subject matter described herein.

FIG. 6A illustrates an example of an apparatus 130. The apparatus 130 may be a controller of an apparatus or device such as a terminal node 110, for example UE 144, or network element 156, such as a gNB.

Implementation of apparatus 130 may be as controller circuitry. The apparatus 130 may be implemented in hardware alone, have certain aspects in software including firmware alone or can be a combination of hardware and software (including firmware).

As illustrated in FIG. 6A the apparatus 130 may be implemented using instructions that enable hardware functionality, for example, by using executable instructions of a computer program 136 in a general-purpose or special-purpose processor 132 that may be stored on a computer readable storage medium (disk, memory etc.) to be executed by such a processor 132.

The processor 132 is configured to read from and write to the memory 134. The processor 132 may also comprise an output interface via which data and/or commands are output by the processor 132 and an input interface via which data and/or commands are input to the processor 132.

The memory 134 stores a computer program 136 comprising computer program instructions (computer program code) that controls the operation of the apparatus 130 when loaded into the processor 132. The computer program instructions, of the computer program 136, provide the logic and routines that enables the apparatus 130 to perform the methods illustrated in FIGS. 2 and/or 3. The processor 132 by reading the memory 134 is able to load and execute the computer program 136.

In examples, the apparatus 130 therefore comprises:

at least one processor 132; and at least one memory 134 including computer program code the at least one memory 134 and the computer program code configured to, with the at least one processor 132, cause the apparatus 130 at least to perform:

receiving control information including a slot format indicator configured to indicate scheduled channel usage for time units, wherein the slot format indicator includes at least one indicator configured to indicate that simultaneous uplink and downlink communications are scheduled to occur on a shared channel in at least one of the time units; and determining a type of channel sensing to use prior to initiating an uplink transmission on at least a portion of the shared channel based, at least in part, on the control information, wherein determining a type of channel sensing to use comprises analysing the scheduled channel usage for, at least, the time unit in which the uplink transmission is scheduled to be initiated and the time unit before the time unit in which the uplink transmission is scheduled to be initiated.

In examples, the apparatus 130 therefore comprises:
at least one processor 132; and
at least one memory 134 including computer program code
the at least one memory 134 and the computer program code configured to, with the at least one processor 132, cause the apparatus 130 at least to perform:
determining control information including a slot format indicator configured to indicate scheduled channel usage for time units, wherein the slot format indicator includes at least one indicator configured to indicate that simultaneous uplink and downlink communications are scheduled to occur on a shared channel in at least one of the time units; and
causing transmission of the control information to at least one user equipment.

As illustrated in FIG. 6A, the computer program 136 may arrive at the apparatus 130 via any suitable delivery mechanism 162. The delivery mechanism 162 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 136. The delivery mechanism may be a signal configured to reliably transfer the computer program 136. The apparatus 130 may propagate or transmit the computer program 136 as a computer data signal.

Computer program instructions for causing an apparatus to perform at least the following or for performing at least the following:
receiving control information including a slot format indicator configured to indicate scheduled channel usage for time units, wherein the slot format indicator includes at least one indicator configured to indicate that simultaneous uplink and downlink communications are scheduled to occur on a shared channel in at least one of the time units; and
determining a type of channel sensing to use prior to initiating an uplink transmission on at least a portion of the shared channel based, at least in part, on the control information, wherein determining a type of channel sensing to use comprises analysing the scheduled channel usage for, at least, the time unit in which the uplink transmission is scheduled to be initiated and the time unit before the time unit in which the uplink transmission is scheduled to be initiated.

Computer program instructions for causing an apparatus to perform at least the following or for performing at least the following:
at least one processor; and
at least one memory including computer program code;
the at least one memory and the computer program code configured to, with the at least one processor, cause the apparatus at least to perform:
determining control information including a slot format indicator configured to indicate scheduled channel usage for time units, wherein the slot format indicator includes at least one indicator configured to indicate that simultaneous uplink and downlink communications are scheduled to occur on a shared channel in at least one of the time units; and
causing transmission of the control information to at least one user equipment.

The computer program instructions may be comprised in a computer program, a non-transitory computer readable medium, a computer program product, a machine readable medium. In some but not necessarily all examples, the computer program instructions may be distributed over more than one computer program.

Although the memory 134 is illustrated as a single component/circuitry it may be implemented as one or more separate components/circuitry some or all of which may be integrated/removable and/or may provide permanent/semi-permanent/dynamic/cached storage.

Figure 6B:
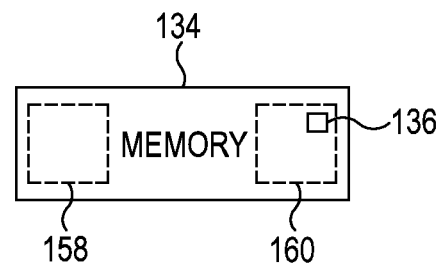
FIG. 6B shows an example of the subject matter described herein.

In examples the memory 134 comprises a random access memory 158 and a read only memory 160. In examples the computer program 136 can be stored in the read only memory 158. See, for example, FIG. 6B In some examples the memory 134 can be split into random access memory 158 and read only memory 160.

Although the processor 132 is illustrated as a single component/circuitry it may be implemented as one or more separate components/circuitry some or all of which may be integrated/removable. The processor 132 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 2 and/or 3 may represent steps in a method and/or sections of code in the computer program 136. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

Thus, the apparatus 130 can, in examples, comprise means for:
  causing receiving control information including a slot format indicator configured to indicate scheduled channel usage for time units, wherein the slot format indicator includes at least one indicator configured to indicate that simultaneous uplink and downlink communications are scheduled to occur on a shared channel in at least one of the time units; and
    determining a type of channel sensing to use prior to initiating an uplink transmission on at least a portion of the shared channel based, at least in part, on the control information, wherein determining a type of channel sensing to use comprises analysing the scheduled channel usage for, at least, the time unit in which the uplink transmission is scheduled to be initiated and the time unit before the time unit in which the uplink transmission is scheduled to be initiated.

Thus, the apparatus 130 can, in examples, comprise means for:
  determining control information including a slot format indicator configured to indicate scheduled channel usage for time units, wherein the slot format indicator includes at least one indicator configured to indicate that simultaneous uplink and downlink communications are scheduled to occur on a shared channel in at least one of the time units; and
  causing transmission of the control information to at least one user equipment.

In examples, an apparatus 130 can comprise means for performing a method, or at least part of a method, as disclosed herein.

The above described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

What is claimed is:

1. An apparatus comprising:
   at least one processor; and
   at least one memory including instructions;
   the at least one memory and the instructions configured to, with the at least one processor, cause the apparatus at least to perform:
   receiving control information including a slot format indicator configured to indicate scheduled channel usage for time units, wherein the slot format indicator includes at least one indicator configured to indicate that simultaneous uplink and downlink communications are scheduled to occur on a shared channel in at least one of the time units;
   determining a type of channel sensing to use prior to initiating an uplink transmission on at least a portion of the shared channel based, at least in part, on the control information; and
   determining the type of channel sensing to use prior to initiating the uplink transmission in a time unit in which simultaneous uplink and downlink communications are scheduled to occur on the shared channel, wherein determining a type of channel sensing to use comprises analysing the scheduled channel usage for, at least, the time unit in which the uplink transmission is scheduled to be initiated and the time unit before the time unit in which the uplink transmission is scheduled to be initiated.

2. The apparatus as claimed in claim 1, wherein the slot format indicator is configured to indicate the type of duplexing scheduled to occur in the time units, and
   wherein the slot format indicator comprises information configured to indicate, at least, downlink, uplink, flexible or simultaneous uplink and downlink on the shared channel for the time units.

3. The apparatus as claimed in claim 1, wherein the determining the type of channel sensing to use further comprises:
   determining if a part of the shared channel is scheduled for downlink transmissions in at least one of the time units before the time unit in which the uplink transmission is scheduled to be initiated; and
   determining if a part of the shared channel is scheduled for simultaneous uplink and downlink transmissions in the time unit in which the uplink transmission is scheduled to be initiated; and
   if it is determined that the part of the shared channel is scheduled for downlink transmissions in the at least one the time units before the time unit in which the uplink transmission is scheduled to be initiated and it is determined that the part of the shared channel is scheduled for simultaneous uplink and downlink transmissions in the time unit in which the uplink transmission is scheduled to be initiated, determining not to use channel sensing prior to initiating the uplink transmission.

4. The apparatus as claimed in claim 3, wherein determining the type of channel sensing to use further comprises:
   determining if the shared channel is scheduled for simultaneous uplink and downlink transmissions in time unit or units in which the uplink transmission is scheduled to occur immediately after the time unit in which the uplink transmission is scheduled to be initiated; and
   if it is determined that the channel is scheduled for simultaneous uplink and downlink transmissions in time unit or units in which the uplink transmission is scheduled to occur immediately after the time unit in which the uplink transmission is scheduled to be initiated, determining not to use channel sensing prior to initiating the uplink transmission.

5. A method comprising:
   receiving control information, including a slot format indicator configured to indicate scheduled channel usage for time units, wherein the slot format indicator includes at least one indicator configured to indicate that simultaneous uplink and downlink communications are scheduled to occur on a shared channel in at least one of the time units;
   determining a type of channel sensing to use prior to initiating an uplink transmission on at least a portion of the shared channel based, at least in part, on the control information; and
   determining the type of channel sensing to use prior to initiating the uplink transmission in a time unit in which simultaneous uplink and downlink communications are scheduled to occur on the shared channel, wherein determining a type of channel sensing to use comprises analysing the scheduled channel usage for, at least, the time unit in which the uplink transmission is scheduled to be initiated and the time unit before the time unit in which the uplink transmission is scheduled to be initiated.

6. The method as claimed in claim 5, wherein the slot format indicator is configured to indicate the type of duplexing scheduled to occur in the time units, and
   wherein the slot format indicator comprises information configured to indicate, at least, downlink, uplink, flexible or simultaneous uplink and downlink on the shared channel for the time units.

7. The method as claimed in claim 5, wherein the determining the type of channel sensing to use further comprises:
   determining if a part of the shared channel is scheduled for downlink transmissions in at least one of the time units before the time unit in which the uplink transmission is scheduled to be initiated; and
   determining if a part of the shared channel is scheduled for simultaneous uplink and downlink transmissions in the time unit in which the uplink transmission is scheduled to be initiated; and
   if it is determined that the part of the shared channel is scheduled for downlink transmissions in at least one of the time units before the time unit in which the uplink transmission is scheduled to be initiated and it is determined that the part of the shared channel is scheduled for simultaneous uplink and downlink transmissions in the time unit in which the uplink transmission is scheduled to be initiated, determining not to use channel sensing prior to initiating the uplink transmission.

8. The method as claimed in claim 7, wherein the determining the type of channel sensing to use further comprises:
   determining if the shared channel is scheduled for simultaneous uplink and downlink transmissions in time unit or units in which the uplink transmission is scheduled to occur immediately after the time unit in which the uplink transmission is scheduled to be initiated; and if it is determined that the channel is scheduled for simultaneous uplink and downlink transmissions in time unit or units in which the uplink transmission is scheduled to occur immediately after the time unit in which the uplink transmission is scheduled to be initiated, determining not to use channel sensing prior to initiating the uplink transmission.

9. A computer program comprising instructions for causing an apparatus to perform at least the following:
   receiving control information including a slot format indicator configured to indicate scheduled channel usage for time units, wherein the slot format indicator includes at least one indicator configured to indicate that simultaneous uplink and downlink communications are scheduled to occur on a shared channel in at least one of the time units;
   determining a type of channel sensing to use prior to initiating an uplink transmission on at least a portion of the shared channel based, at least in part, on the control information; and
   determining the type of channel sensing to use prior to initiating the uplink transmission in a time unit in which simultaneous uplink and downlink communications are scheduled to occur on the shared channel, wherein determining a type of channel sensing to use comprises analysing the scheduled channel usage for, at least, the time unit in which the uplink transmission is scheduled to be initiated and the time unit before the time unit in which the uplink transmission is scheduled to be initiated.

10. The computer program as claimed in claim 9, wherein the slot format indicator is configured to indicate the type of duplexing scheduled to occur in the time units, and
   wherein the slot format indicator comprises information configured to indicate, at least, downlink, uplink, flexible or simultaneous uplink and downlink on the shared channel for the time units.

11. The computer program as claimed in claim 9, wherein the determining the type of channel sensing to use further comprises:
   determining if a part of the shared channel is scheduled for downlink transmissions in at least one of the time units before the time unit in which the uplink transmission is scheduled to be initiated; and
   determining if a part of the shared channel is scheduled for simultaneous uplink and downlink transmissions in the time unit in which the uplink transmission is scheduled to be initiated; and
   if it is determined that the part of the shared channel is scheduled for downlink transmissions in at least one of the time units before the time unit in which the uplink transmission is scheduled to be initiated and it is determined that the part of the shared channel is scheduled for simultaneous uplink and downlink transmissions in the time unit in which the uplink transmission is scheduled to be initiated, determining not to use channel sensing prior to initiating the uplink transmission.

12. The computer program as claimed in claim 11, wherein determining the type of channel sensing to use further comprises:
   determining if the shared channel is scheduled for simultaneous uplink and downlink transmissions in time unit or units in which the uplink transmission is scheduled to occur immediately after the time unit in which the uplink transmission is scheduled to be initiated; and
   if it is determined that the channel is scheduled for simultaneous uplink and downlink transmissions in time unit or units in which the uplink transmission is scheduled to occur immediately after the time unit in which the uplink transmission is scheduled to be initiated, determining not to use channel sensing prior to initiating the uplink transmission.

\* \* \* \* \*